United States Patent [19]
Coates

[11] 4,449,414
[45] May 22, 1984

[54] FLUID-RESPONSIVE APPARATUS

[75] Inventor: Terence J. Coates, Chiddingfold, England

[73] Assignee: Smiths Industries Public Limited Company, London, England

[21] Appl. No.: 371,885

[22] Filed: Apr. 26, 1982

[30] Foreign Application Priority Data

May 21, 1981 [GB] United Kingdom ............. 8115667

[51] Int. Cl.³ .............................................. G01F 1/80
[52] U.S. Cl. ................................. 73/861.37; 73/32 A
[58] Field of Search ............. 73/32 A, 861.02, 861.03, 73/861.36, 861.37

[56] References Cited

U.S. PATENT DOCUMENTS

| | | | |
|---|---|---|---|
| 3,199,347 | 8/1965 | Moss | 73/861.36 |
| 3,498,129 | 3/1970 | Bodge | |
| 3,538,767 | 11/1970 | Pustell et al. | |
| 3,640,133 | 2/1972 | Adams | |
| 3,690,147 | 9/1972 | Kuenzler | 73/32 A |
| 3,698,245 | 10/1972 | McNabb | |
| 4,173,142 | 11/1979 | Heinz | |
| 4,240,285 | 12/1980 | Langdon | 73/32 A |
| 4,250,745 | 2/1981 | Blatter et al. | |
| 4,311,054 | 1/1982 | Cox et al. | |
| 4,312,235 | 1/1982 | Daigle | |

FOREIGN PATENT DOCUMENTS

| | | |
|---|---|---|
| 991736 | 5/1965 | United Kingdom . |
| 1591974 | 7/1981 | United Kingdom . |

OTHER PUBLICATIONS

"Advances in True Mass Fuel Flow Flight Test Instrumentation", by Thorson et al., ISA ASI 75248, pp. 269–278, (1975).
"Mass Flow Metering", by R. Wasson, Measurement and Control, vol. 5, 12/72.
"Momentum Principle Measures Mass Rate of Flow", by V. A. Orlando et al., Trans ASME 8154, pp. 961–965.
"A Fast-Response True-Mass-Rate Flowmeter", by Li et al., Trans. ASME, 7/53, pp. 835–841.

*Primary Examiner*—Herbert Goldstein
*Attorney, Agent, or Firm*—Pollock, Vande Sande and Priddy

[57] ABSTRACT

Apparatus for measuring mass flow or density of fluid has a turbine mounted resiliently by torque rods within the fluid-flow line. The turbine has a number of vanes that extend radially to define passages parallel to the flow of fluid in the fluid-flow line. A torque driver causes oscillatory rotation of the turbine so as to give fluid in the passages a component of displacement at right angles to the passages. The turbine is driven simultaneously at two frequencies, displacement being sensed by a pick-off. The first frequency $f_{90}$ is adjusted so that a 90° phase difference is produced between the drive signal and the turbine displacement—the density of fluid being derived from this frequency. The second frequency $f_D$ is a fixed fraction F of the first frequency, the phase difference between the second frequency and turbine displacement being used to derive an indication of mass flow.

18 Claims, 3 Drawing Figures

FLUID-RESPONSIVE APPARATUS

BACKGROUND OF THE INVENTION

This invention relates to fluid-responsive apparatus.

The invention is more particularly concerned with mass flowmeters and densitometers.

Flowmeters responsive to the rate of flow of mass of fluid are useful in many applications where the density of the fluid might change, such as, upon a change in temperature of the fluid. Mass flowmeters are used, for example, in aircraft where it is the mass, rather than the volume, of fuel supplied to an engine that determines the thrust produced by the engine.

In one form of presently available mass flowmeter (such as described in U.S. Pat. No. 2,714,310), an impeller mounted in the fluid flow path is rotated by a motor so as to give the fluid a swirling motion. The momentum imparted to the fluid by the impeller is used to rotate a turbine, mounted downstream, against the action of a spring. The torque applied to the turbine is measured and gives an indication of the mass flow of fluid. Various modifications and refinements of this arrangement have been proposed but they all require the provision of a rotating member and the consequent problems associated with the use of rotary bearings, such as their expense, relatively short life, and difficulties of lubrication.

An alternative flowmeter (such as described in U.S. Pat. No. 4,252,028) employs the Coriolis force for the measurement of mass flow, including a 'U' shape tube through which the fluid flows. Drive is applied to vibrate the tube and sensors are used to measure the resulting Coriolis force, from which the mass flow can be determined. While such flowmeters are satisfactory where they can be rigidly mounted in a fixed location, they are bulky and sensitive to external vibration, making them unsuitable for many applications, such as, in aircraft.

BRIEF SUMMARY OF THE INVENTION

It is an object of the present invention, to provide fluid-responsive apparatus that can be used to overcome the above-mentioned problems and disadvantages.

According to one aspect of the present invention there is provided fluid-responsive apparatus including turbine means defining a passage through which fluid is to flow, means resiliently mounting said turbine means within a fluid flow path for limited angular displacement about an axis substantially parallel to the flow of fluid, drive means arranged to apply oscillatory drive to said turbine means about said axis such that fluid within said passage is given a component of displacement at right angles to the direction of flow through said passage, and means for sensing the displacement of said turbine means relative to the phase of the torque applied to said turbine means such as thereby to enable the mass flow of fluid to be determined.

The drive means may be arranged to apply a first drive signal to said turbine means at a first frequency that produces a phase difference of substantially 90 degrees between the drive signal and the turbine displacement. The drive means may be arranged also to apply a second drive signal to said turbine means at a second frequency that is a fixed fraction of said first frequency, the phase difference between said second drive signal and said turbine displacement being used to derive an indication of the mass flow of fluid.

The spring torsional stiffness of the resilient mounting of said turbine means may be of the order of $4\pi^2 f^2 m$ and the mass flow of fluid may be determined substantially from the expression $k = \Delta t.s(1 - F^2)$. Alternatively, the spring torsional stiffness of the resilient mounting of said turbine means may be significantly greater than $4\pi^2 f^2 m$ and the mass flow of fluid may be determined from the expression $k = \Delta t.s$.

According to another aspect of the present invention there is provided fluid-responsive apparatus including turbine means defining a passage for receiving fluid, means resiliently mounting said turbine means for limited angular displacement, drive means arranged to apply oscillatory drive to said turbine means about its axis such that fluid within said passage is given a component of displacement at right angles to said axis, wherein the frequency of said drive means is adjusted until the phase difference between said drive and the displacement of said turbine is substantially 90 degrees, and wherein an indication of the density of said fluid is provided in accordance with said frequency.

According to a further aspect of the present invention there is provided a method of measuring the mass flow of fluid comprising the steps of applying oscillatory drive to turbine means mounted resiliently within a fluid flow path for limited angular displacement about an axis substantially parallel to the flow of fluid, such as to cause angular displacement of said turbine means about said axis and thereby give fluid within said turbine means a component of displacement at right angles to said axis; sensing displacement of said turbine means relative to the phase of the torque applied to said turbine means; and deriving therefrom an indication of the mass flow of fluid through said turbine means.

According to yet another aspect of the present invention there is provided a method of measuring the density of fluid within a passage defined by turbine means, comprising the steps of applying oscillatory drive to turbine means mounted resiliently within a fluid flow path such as to cause limited angular displacement of said turbine means about its axis and thereby give fluid within said turbine means a component of displacement at right angles to said axis; sensing displacement of said turbine means relative to the phase of the torque applied to said turbine means; adjusting the frequency of the drive until the phase difference between said drive and the displacement of said turbine is substantially 90 degrees; and providing an indication of the density of said fluid in accordance with said frequency.

A flowmeter, capable of also functioning as a densitometer, for determining the mass flow and density of fuel flowing along a pipeline in an aircraft, will now be described, by way of example, with reference to the accompanying drawings.

DETAILED DESCRIPTION

Figure 1:
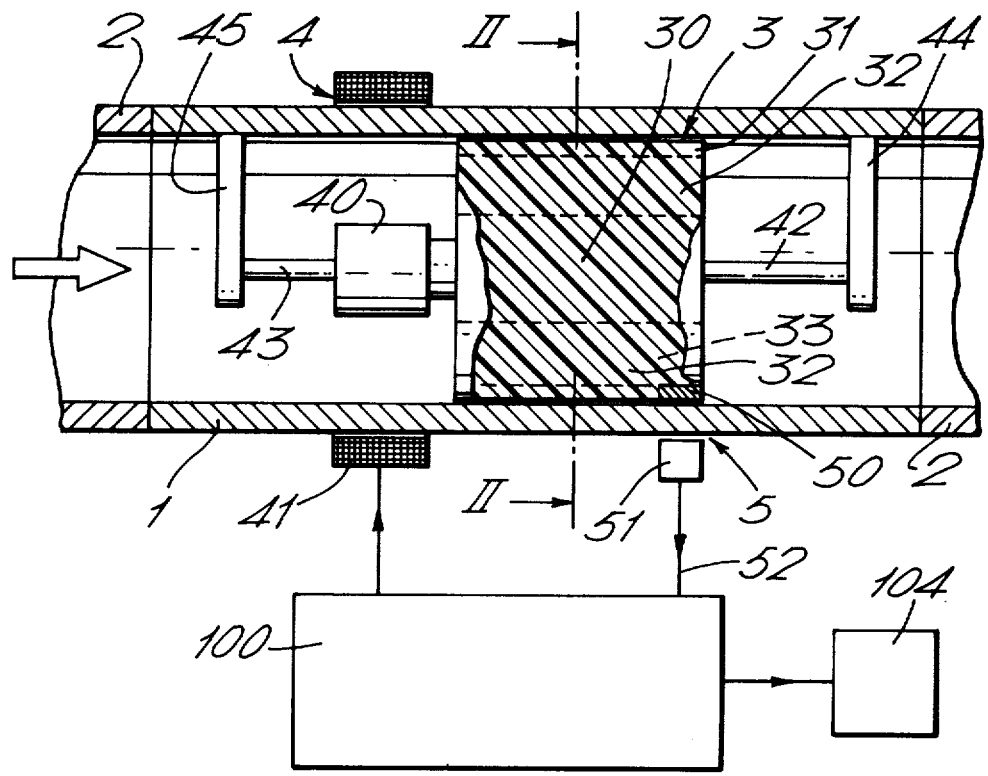
FIG. 1 is a diagrammatic cut-away elevation of the flowmeter.
Figure 2:
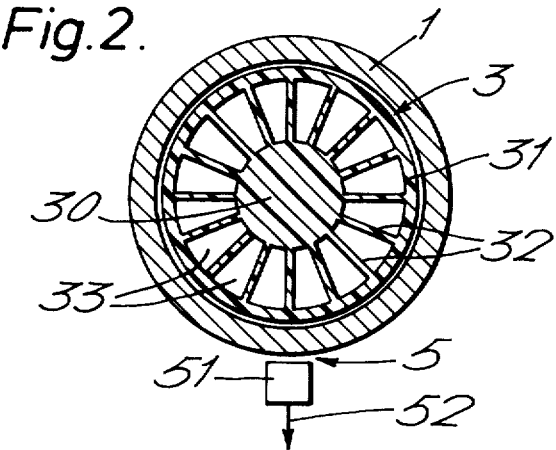
FIG. 2 is a cross-sectional view of a part of the flowmeter along line II—II of FIG. 1.

With reference to FIGS. 1 and 2, a part of the flowmeter is mounted within a cylindrical outer tube 1 that is joined to, or forms a part of, the pipeline 2 through which the fluid to be measured flows. The flowmeter has a single turbine 3 that is oscillated angularly within the fluid flow path by an oscillating electrical torque driver 4. Oscillation of the turbine 3 is sensed by a pick-off 5, the output phase of which is compared with the phase of the current supplied to the driver 4 to derive an indication of the mass flow through the pipeline 2.

The turbine 3 is an integral construction, of a plastics material, and is preferably the same density as, or less dense then, the fluid with which it is to be used. The turbine 3 comprises a solid central hub 30 of cylindrical shape, an outer tubular sleeve 31 extending axially of the hub and supported by sixteen radially extending vanes 32 of rectangular shape which extend parallel to the length of the turbine. The diameter of the outer sleeve 31 is about the same as the inner diameter of the tube 1, leaving just enough room between the two components to permit free angular movement. Fluid flow through the tube 1 is constrained by the turbine 3 along the sixteen longitudinal passages 33 defined between the hub 30 and the sleeve 31, and between the vanes 32.

The torque driver 4 may take many different forms, being mounted with the turbine 3 to impart oscillatory angular displacement to it. In the arrangement shown, the driver 4 comprises a hysteresis assembly 40 mounted with the turbine 3 within the tube 1, and electromagnetic drive coils 41 mounted externally of the tube. The drive coils 41 are arranged, when energized by signals from a control unit 100, to produce a magnetic field that interacts with the hysteresis assembly 40 and applies an angular torque to the turbine 3 that is proportional to the drive current.

Axial torque rods 42 and 43 project from the downstream end of the turbine 3 and the upstream end of the hysteresis assembly 40. The torque rods 42 and 43 are supported at their outer ends by brackets 44 and 45 respectively which are secured to the inner surface of the tube 1. The rods 42 and 43 may be of steel or other material and serve to support the turbine 3 and hysteresis assembly resiliently within the tube 1.

Oscillation of the turbine 3, caused by the torque driver 4 is measured by the pick-off 5 which comprises a permanent magnet 50 mounted on the turbine, close to its outer surface, and a coil 51, mounted outside the tube 1, current being produced in the coil by movement of the magnet. The output of the coil 51 is supplied via line 52 to the control unit 100.

Figure 3:
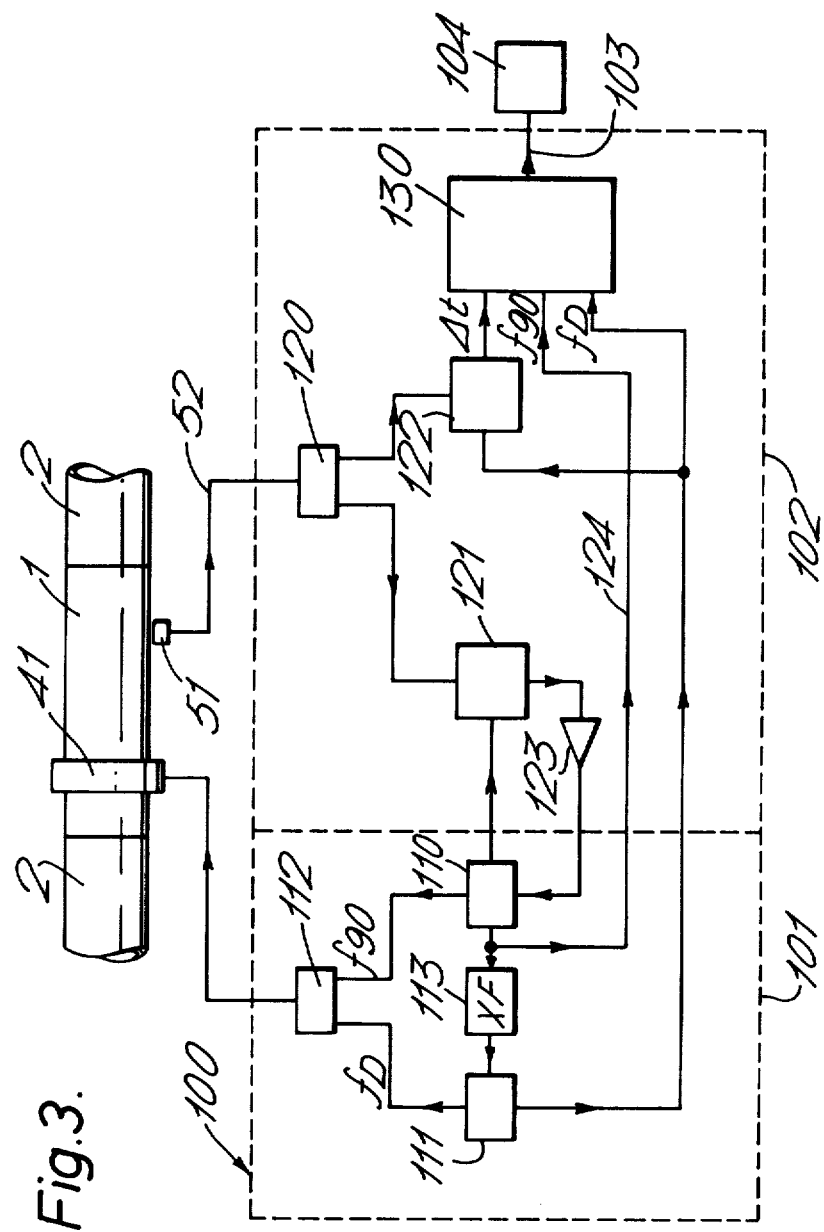
FIG. 3 shows the associated circuitry of the flowmeter of FIGS. 1 and 2.

The control unit 100, shown in greater detail in FIG. 3, comprises a drive unit 101 and a sensing unit 102, and provides an output on line 103 to a separate display unit 104.

The drive unit 101 includes two oscillators 110 and 111 which supply sinusoidal signals to a drive interface unit 112 which in turn supplies signals to the coils 41. A multiplier unit 113 is also included in the drive unit 101 intermediate the two oscillators 110 and 111, the multiplier unit multiplying the oscillatory output of the first oscillator by a fraction F and supplying a signal representative of this product to control the frequency of the second oscillator.

The sensing unit 102 includes a pick-off interface unit 120 which supplies outputs to a phase-sensitive detector 121 and a timer 122. The phase-sensitive detector 121 is connected in a loop with an amplifier 123 and the first oscillator 110 of the drive circuit. The timer 122 also receives an input from the second oscillator 111 and provides an output to a computing unit 130, which in turn provides the output on line 103.

In operation, the frequency $f_{90}$ of the first oscillator 110 is varied by the input from the amplifier 123 until there is a 90° phase difference, as sensed by the detector 121, between the output of the first oscillator and the deflection of the turbine 3 (as sensed by the pick-off 5). Varying the frequency $f_{90}$ of the first oscillator 110 causes a corresponding change in the frequency $f_D$ of the second oscillator 111.

The frequency $f_{90}$ of the first oscillator 110 is supplied via line 124 to the computer 130 and is directly related to the density of fluid in the passages 33 through the turbine 3, the computer 130 providing a suitable output representative of density. The time difference $\Delta t$ between the drive signal from the second oscillator 111 and the deflection of the turbine 3 is determined by the timer 122 and supplied to the computer 130. The mass flow is determined by the computer 130 from knowledge of the upper and lower drive frequencies $f_{90}$ and $f_D$ (or their ratio) and the time difference $\Delta t$, in the manner described below.

Ignoring friction and viscosity, the phase difference D between the drive signal and the actual deflection of the turbine 3, is given by the expression:

$$\tan D = -2\pi f k / (s - 4\pi^2 f^2 m) \tag{1}$$

where
f is the drive frequency,
k is the product of the mass flow rate and the square of the mean radius of flow through the turbine 3,
s is the spring torsional stiffness of the rods 42 and 43, and
m is the moment of inertia of the turbine 3 and the fluid contained within it.

If the flowmeter is designed such that $$s >> 4\pi^2 f^2 m \tag{2}$$

and
D is small, less than about 5°, then:
$$D = -2\pi f k/s \text{ radians} \tag{3}$$

The time difference between the drive signal and the actual deflection of the turbine 3 is given by:

$$\Delta t = D/2\pi f \tag{4}$$

so from (3):

$$\Delta t = k/s \tag{5}$$

or $$k = \Delta t \cdot s \tag{6}$$

It can be seen therefore that the time difference $\Delta t$ is proportional to the mass flow rate and is independent of the amplitude of vibration and the fluid density.

If the spring torsional stiffness $s = 100\pi^2 f^2 m$ and $f = 0.86$ Hz, for a typical flowmeter this would give the diameter of the torsion rods 42 and 43 to be about 0.9 mm. This is rather small and would therefore make the torsion rods weak in the bending mode. Although this weakness would not matter when the turbine 3 is supported within fluid of the same density, it would make the flowmeter liable to damage when empty.

To overcome this, the spring torsional stiffness s can be changed so as to be not much greater than $4\pi^2 f^2 m$ (thereby enabling the diameter of the rods to be increased) and a correction made for the resulting dependence of expression (1) on f and m.

Obviously f can be determined readily, m being determined in the way set out below.

The drive frequency is first varied until there is a 90° phase difference, that is:

$$\tan D = \infty \tag{7}$$

from expression (1) this gives:

$$s = 4\pi^2 f^2 m \tag{8}$$

Let this frequency be $f_{90}$

If drive is then applied at a frequency $f_D$ which is some fixed fraction F of $f_{90}$ then expression (1) becomes:

$$\tan D = -2\pi f_D k/(s - 4\pi^2 f_D^2 m) \tag{9}$$
$$= -2\pi f_D k/s(1 - F^2) \tag{10}$$

and, from the expression (4)

$$\Delta t = k/s(1 - F^2) \tag{11}$$

giving $k = \Delta t \cdot s(1 - F^2)$ (12)

Thus, providing frequencies $f_{90}$ and $f_D$ (or their ratio) are known, the mass flow rate can be readily determined by the computer unit 130 from the time difference and the known parameters of the flowmeter. From expression (8):

$$m = s/4\pi^2 f_{90}^2 \tag{13}$$

Since the only variable on which the moment of inertia m is dependent is the density of fluid within the turbine 3, it can be seen that the upper drive frequency $f_{90}$ is directly related to density thereby enabling the computer unit 130 to give a density output.

Preferably, the two frequencies $f_{90}$ and $f_D$ are applied simultaneously by the two oscillators 110 and 111, and are adjusted until a 90° phase shift is obtained at the upper drive frequency. This is used to give the density output; the time difference of the lower drive frequency $f_D$ being measured to give the mass flow output.

The two frequencies $f_{90}$ and $f_D$ are preferably not a direct multiple of one another, to avoid any harmonic frequency that might be set up by one drive frequency being confused with the other drive frequency. Instead, the two frequencies may be related by a fraction such as $\frac{3}{4}$ or $\frac{5}{8}$.

It will be appreciated that the two frequencies need not be applied simultaneously, instead, the upper drive frequency $f_{90}$ could be applied initially and then the flowmeter operated at the lower frequency $f_D$. This, however, has the disadvantage of leading to errors if the density of the fluid changes during operation.

The above two cases, that is, where s is much greater than $4\pi^2 f^2 m$, and where s is substantially equal to $4\pi^2 f^2 m$, enable the mass flow rate to be calculated relatively easily. These, however, are only special examples of the general design and it would be possible to operate under different conditions if the drive frequency is known.

The apparatus described enables the mass flow of fluid to be readily determined without the need for any rotary or sliding bearings. The apparatus can also be compact since the major part is contained within the fluid flow pipeline, its symmetrical construction making it relatively insensitive to vibration. The ability to provide a density output is also a useful feature and the apparatus could be used solely as a densitometer without the facility for indicating mass flow. It will be appreciated that the volume flow of fluid could be readily determined, if necessary, from the mass flow and density outputs.

Various modifications are also possible to the construction of the flowmeter. The torque driver could take many different forms; for example, it could have a permanent magnet rotor mounted within the tube 1 that is acted on by energized coils outside the pipeline. The driver could comprise permanent magnets mounted directly on the turbine that are acted on by external coils. Alternatively, the torque driver could comprise a motor mounted entirely within the tube 1.

The turbine could have a different number of vanes and could be of various shapes and materials. The passages through the turbine could be provided by cylindrical holes. Guides could be used to improve the flow of fluid through the turbine.

In place of the single axial torque rods described above it would be possible to use other resilient suspensions such as could be formed from several blades arranged in a cruciform shape.

The electromagnetic pick-off used to determine the position of the turbine could be replaced by an optical or other form of pick-off.

It would also be possible to use an accelerometer mounted on the turbine to derive an output indicative of the phase of the turbine displacement.

What I claim is:

1. Fluid-responsive apparatus comprising turbine means defining a passage through which fluid is to flow; means resiliently mounting said turbine means for limited angular displacement about an axis substantially parallel to the flow of fluid; drive means coupled with said turbine means for applying oscillatory drive to said turbine means about said axis such that fluid within said passage is given a component of displacement at right angles to the direction of flow through said passage; means for sensing angular displacement of said turbine means about said axis, said means for sensing said angular displacement of said sensor means including timer means for deriving an indication of the time difference between application of drive to said turbine means and angular displacement of said turbine means; computer means; and means for supplying signals to said computer means representative of torque applied by said drive means and angular displacement of said turbine means, the computer means deriving an indication of the mass flow of fluid from the phase difference between the torque applied to said turbine means and its angular displacement.

2. Fluid-responsive apparatus according to claim 1, wherein said drive means applies a first drive signal to said turbine means at a first frequency that produces a phase difference of substantially 90 degrees between the drive signal and the turbine displacement.

3. Fluid-responsive apparatus according to claim 2, wherein said drive means also applies a second drive signal to said turbine means at a second frequency that is a predetermined fraction of said first frequency, and wherein said computer means derives an indication of the mass flow of fluid from the phase difference between said second drive signal and said turbine displacement.

4. Fluid-responsive apparatus according to claim 3, wherein said drive means applies said first and second drive signals simultaneously to said turbine means.

5. Fluid-responsive apparatus according to claim 3, wherein said first and second frequencies are not a direct multiple of one another.

6. Fluid-responsive apparatus comprising: turbine means defining a passage through which fluid is to flow; means for resiliently mounting said turbine means for limited angular displacement about an axis substantially parallel to the flow of fluid, said resilient mounting means having a spring torsional stiffness (s) of the order of $4\pi^2 f^2 m$, where f in the frequency of said turbine means, and m is the moment of inertia of said turbine means and the fluid within it; drive means coupled with said turbine means for applying oscillatory drive to said turbine means about said axis such that fluid within said passage is given a component of displacement at right angles to the said axis, said drive means being operative to apply a first drive signal to said turbine means at a first frequency that produces a phase difference of substantially 90° between said first drive signal and the angular displacement of said turbine means, and said drive means being operative to apply a second drive signal to said turbine means at a predetermined fraction (F) of said first frequency; means for sensing angular displacement of said turbine means; computer means; and means for supplying signals to said computer means representative of torque applied by said drive means and angular displacement of said turbine means, said computer means being operative to derive an indication of the mass flow of fluid substantially from the expression $k = \Delta t.s(1 - F^2)$, where k is the product of the mass flow rate and the square of the mean radius of flow through said turbine means, and $\Delta t$ is the time difference between said second drive signal and the angular displacement of said turbine means.

7. Fluid-responsive apparatus comprising: turbine means defining a passage through which fluid is to flow; means resiliently mounting said turbine means for limited angular displacement about an axis substantially parallel to the flow of fluid; drive means coupled with said turbine means for applying first and second oscillatory drive signals to said turbine means about said axis such that fluid within said passage is given a component of displacement at right angles to the direction of flow through said passage, said first drive signal being at a first frequency that produces a phase difference of substantially 90° between said first drive signal and the angular displacement of said turbine means, and said second drive signal being at a second frequency that is a known fraction of said first frequency; means for sensing angular displacement of said turbine means; computer means; and means for supplying signals to said computer means representative of torque applied by said drive means and angular displacement of said turbine means, the computer means being operative to derive an indication of the mass flow of fluid from the relative values of said first and second frequencies and from the phase difference between said second drive signal and the angular displacement of said turbine means.

8. Fluid-responsive apparatus according to claim 7 wherein said computer means derives an indication of the density of fluid within said turbine means in accordance with said first frequency ($f_{90}$) and substantially from the expression $m = s/4\pi^2 f_{90}^2$, where m is the moment of inertia of said turbine means and the fluid within it, and s is the spring torsional stiffness of the means resiliently mounting said turbine means.

9. Fluid-responsive apparatus according to claim 7, wherein the spring torsional stiffness (s) of said means resiliently mounting said turbine means is of the order of $4\pi^2 f^2 m$, where m is the moment of inertia of said turbine means and the fluid within it, and f is said first frequency.

10. Fluid-responsive apparatus according to claim 9, wherein said computer means derives an indication of the mass flow of fluid substantially from the expression $k = \Delta t.s(1 - F^2)$, where k is the product of mass flow rate and the square of the mean radius of flow through said turbine means, $\Delta t$ is the time difference between said second drive signal and the angular deflection of said turbine means, and F is the ratio of said second frequency to said first frequency.

11. Fluid-responsive apparatus according to claim 7, wherein the spring torsional stiffness (s) of said means resiliently mounting said turbine means is significantly greater than $4\pi^2 f^2 m$, where f is said first frequency, and m is the moment of inertia of said turbine means and the fluid within it.

12. Fluid-responsive apparatus according to claim 11, wherein said computer means derives an indication of the mass flow of fluid substantially from the expression $k = \Delta t.s$, where k is the product of mass flow rate and the square of the mean radius of flow through said turbine means, and $\Delta t$ is the time difference between said second drive signal and the angular displacement of said turbine means.

13. Fluid responsive apparatus according to claim 7, wherein said turbine means is of substantially the same density as the fluid with which it is used.

14. Fluid-responsive apparatus according to claim 7, wherein said turbine means comprises a central hub and a plurality of vanes mounted on said hub to extend radially and parallel to said axis so as to define a plurality of passages.

15. Fluid-responsive apparatus according to claim 7, including a fluid-flow line, said turbine means being mounted within said fluid-flow line, and wherein said drive means comprises: a hysteresis member; means mounting said hysteresis member on said turbine; drive coils; and means mounting said drive coils externally of said fluid-flow line such as to cooperate with said hysteresis member.

16. Fluid-responsive apparatus according to claim 7 wherein said means for sensing angular displacement of said turbine means includes timer means, said timer means deriving an indication of said phase difference in terms of time.

17. Fluid-responsive apparatus according to claim 7 wherein said drive means applies said first and second drive signals simultaneously to said turbine means.

18. Fluid-responsive apparatus according to claim 7 wherein said first and second frequencies are not a direct multiple of one another.

* * * * *